US012667903B2

(12) United States Patent  
Maeda et al.

(10) Patent No.: US 12,667,903 B2  
(45) Date of Patent: Jun. 30, 2026

(54) METHOD FOR PRODUCING RESISTANCE-WELDED MEMBER

(71) Applicant: Kobe Steel, Ltd., Kobe (JP)

(72) Inventors: Kyohei Maeda, Kanagawa (JP); Reiichi Suzuki, Kanagawa (JP); Ryohei Ihara, Hyogo (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 902 days.

(21) Appl. No.: 17/996,257

(22) PCT Filed: Mar. 10, 2021

(86) PCT No.: PCT/JP2021/009657  
§ 371 (c)(1),  
(2) Date: Oct. 14, 2022

(87) PCT Pub. No.: WO2021/210303  
PCT Pub. Date: Oct. 21, 2021

(65) Prior Publication Data  
US 2023/0201949 A1 Jun. 29, 2023

(30) Foreign Application Priority Data

Apr. 15, 2020 (JP) .................................. 2020-073130

(51) Int. Cl.  
*B23K 11/11* (2006.01)  
*B23K 11/16* (2006.01)  
(Continued)

(52) U.S. Cl.  
CPC ............. *B23K 11/11* (2013.01); *B23K 11/163* (2013.01); *B23K 11/255* (2013.01);  
(Continued)

(58) Field of Classification Search  
CPC ....... B23K 11/11; B23K 11/163; B23K 11/24; B23K 11/255; B23K 11/257; B23K 2101/18; B23K 2101/34; B23K 2103/04  
(Continued)

(56) References Cited

U.S. PATENT DOCUMENTS

| | | | |
|---|---|---|---|
| 4,734,555 A | 3/1988 | Ferguson | |
| 2017/0080515 A1* | 3/2017 | Furusako | ................ B23K 11/11 |

(Continued)

FOREIGN PATENT DOCUMENTS

| | | |
|---|---|---|
| JP | 2011-67853 A | 4/2011 |
| JP | 2015-93282 A | 5/2015 |

(Continued)

OTHER PUBLICATIONS

International Search Report issued May 11, 2021 in PCT/JP2021/009657 filed on Mar. 10, 2021, 2 pages.

(Continued)

*Primary Examiner* — Ibrahime A Abraham  
*Assistant Examiner* — Joseph W Iskra  
(74) *Attorney, Agent, or Firm* — Oblon, McClelland, Maier & Neustadt, L.L.P.

(57) ABSTRACT

A method for producing a resistance-welded member made of three or more sheets including a plated steel sheet includes: a main energizing by performing energization with a first current value while compressing the steel sheet with a first compressive force to form a nugget; a subsequent energizing by performing, after the main energizing, energization such that the current value gradually decreases from the first current value while compressing with a second compressive force greater than the first compressive force; and holding an electrode while maintaining the second compressive force after the subsequent energizing. The second compressive force and a total sheet thickness, com- (Continued)

pression rise delay time, and a downslope time and an electrode holding time satisfy respective predetermined conditions.

8 Claims, 6 Drawing Sheets

(51) Int. Cl.

| | | |
|---|---|---|
| *B23K 11/25* | (2006.01) | |
| *B23K 101/18* | (2006.01) | |
| *B23K 101/34* | (2006.01) | |
| *B23K 103/04* | (2006.01) | |

(52) U.S. Cl.
CPC ........ *B23K 11/257* (2013.01); *B23K 2101/18* (2018.08); *B23K 2101/34* (2018.08); *B23K 2103/04* (2018.08)

(58) Field of Classification Search
USPC .......................................................... 219/91.2
See application file for complete search history.

(56) References Cited

U.S. PATENT DOCUMENTS

| | | | | |
|---|---|---|---|---|
| 2017/0232547 A1* | 8/2017 | Chai | ...................... | B23K 11/11 |
| | | | | 219/86.22 |
| 2018/0243853 A1 | 8/2018 | Yoshinaga et al. | | |
| 2020/0316707 A1 | 10/2020 | Furusako et al. | | |

FOREIGN PATENT DOCUMENTS

| | | | |
|---|---|---|---|
| JP | 2017-047475 A | | 3/2017 |
| JP | 2019-147187 A | | 9/2019 |
| JP | 2019147187 | * | 9/2019 |
| KR | 10-2019-0089192 A | | 7/2019 |
| WO | WO 2018/123350 A1 | | 7/2018 |

OTHER PUBLICATIONS

Extended European Search Report issued Sep. 6, 2023 in European Patent Application No. 21788955.9, 7 pages.

* cited by examiner

METHOD FOR PRODUCING RESISTANCE-WELDED MEMBER

CROSS REFERENCE TO RELATED APPLICATIONS

This application is a National Stage entry under 35 U.S.C. § 371 of PCT/JP2021/009657, filed on Mar. 10, 2021, and claims priority to Japanese Patent Application No. 2020-073130, filed on Apr. 15, 2020, the entire contents of which are incorporated herein by reference.

TECHNICAL FIELD

The present invention relates to a method for producing a resistance-welded member, and more particularly, to a method for producing a resistance-welded member in which spot welding is performed by sandwiching and energizing, with a pair of electrodes, both surfaces of a set of three or more sheets including at least one plated steel sheet.

BACKGROUND ART

In a plated high-tensile steel sheet, a molten metal brittle crack (hereinafter also referred to as LME crack) occurs at a welded portion due to components in steel. In particular, in the case of a set of three or more sheets, an internal crack of a nugget and a crack originating from the inside of a corona bond (hereinafter, also referred to as an internal crack of a corona bond) are likely to occur. Patent Literature 1 describes a spot welding method in which, in spot welding of a set of sheets including a galvanized steel sheet, an after-weld holding time from the end of welding energization between electrodes to a time point when the electrodes and a member to be welded are not in contact with each other is set in accordance with a total sheet thickness of the steel sheets, whereby even when a disturbance factor is present, cracks just outside a corona bond and at a nugget of a corona bond can be suppressed, and a high-quality spot welded joint can be obtained.

CITATION LIST

Patent Literature

Patent Literature 1: JP-A-2017-47475

SUMMARY OF INVENTION

Technical Problem

However, in the spot welding of a set of three or more sheets, it is difficult to prevent the LME crack only by controlling the after-weld holding time described in Patent Literature 1. In addition, Patent Literature 1 does not specify the presence or absence of a compressive control and a relationship between subsequent energization and a holding time at all, and there is room for improvement.

The present invention has been made in view of the above-described problems, and an object of the present invention is to provide a method for producing a resistance-welded member by which an internal crack of a nugget and an internal crack of a corona bond can be suppressed in spot welding of a set of three or more sheets including at least one plated steel sheet.

Solution to Problem

Accordingly, the above object of the present invention is attained with a configuration of the following (1) related to a method for producing a resistance-welded member.

(1) A method for producing a resistance-welded member made of three or more steel sheets including at least one plated high-tensile steel sheet having a base metal strength of 980 MPa or more, the method including:

a main energization step of performing energization with a first current value I1 while compressing the steel sheets with a first compressive force P1 to form a nugget;

a subsequent energization step of performing, after the main energization step, energization such that a current value gradually decreases from the first current value I1 while compressing the steel sheets with a second compressive force P2 greater than the first compressive force P1; and an electrode holding step of holding an electrode while maintaining the second compressive force P2 after the subsequent energization, wherein the steel sheets are joined under conditions satisfying the following formulae (1) to (3):

$$A \geq 1.9 \qquad \text{Formula (1)}$$

where A=P2/t, P2 represents the second compressive force [kN], and t represents a total sheet thickness [mm] of the steel sheets, respectively, $$0 \leq Tdl \leq 200 \qquad \text{Formula (2)}$$

where Tdl represents a compression rise delay time [ms] which is a time difference between an end of energization with the first current value I1 and a start of compression with the second compressive force P2, and $$B \leq Tds \leq C \qquad \text{Formula (3)}$$

where B=0.0011Tht²−2.64Tht+1284.8, C=0.0015Tht²−2.52Tht+1268.6, Tds represents a down slope time [ms] in the subsequent energization step, and Tht represents an electrode holding time [ms] in the electrode holding step, respectively.

Further, preferred embodiments of the present invention related to a method for producing a resistance-welded member relates to following (2) to (4).

(2) The method for producing a resistance-welded member according to (1), wherein the Tht satisfies the following formula (4):

$$Tht < 700 \qquad \text{Formula (4)}.$$

(3) The method of producing a resistance-welded member according to (1) or (2), wherein a tip end diameter of the electrode is 4 mm to 10 mm.

(4) The method for producing a resistance-welded member according to any one of (1) to (3), wherein a servo compression welding machine is used as a welding machine, and when a depth of an indentation on the steel sheet by the electrode becomes 0.15 mm or more, control is performed to forcibly terminate only the energization or both the energization and the compression.

Advantageous Effects of Invention

According to the method for producing a resistance-welded member of the present invention, a main energization step of performing energization with a first current value I1 while compressing steel sheets with a first compressive force P1; a subsequent energization step of performing, after the main energization step, energization such that a current value gradually decreases from the first current value I1 while compressing the steel sheets with a second compressive force P2 greater than the first compressive force P1; and an electrode holding step of holding an electrode while maintaining the second compressive force P2 after the subsequent energization are provided, the subsequent energization by a downslope is performed after the main energization, and the compressive force is increased during the downslope. Therefore, even when spot welding three or more plated high-tensile steel sheets having a base metal strength of 980 WPa or more, contraction of a nugget can be suppressed and a tensile stress acting on a welded portion can be reduced.

In addition, by controlling the second compressive force P2 and a total sheet thickness t of the steel sheets, the first current value I1 and a second current value I2, and a downslope time Tw2 of the subsequent energization and an electrode holding time Tht after the end of the subsequent energization so as to satisfy a predetermined relationship, the temperature of the welded portion and the tensile stress at the time of electrode opening can be optimized, and thus the internal crack of a nugget and the internal crack of a corona bond can be suppressed.

DESCRIPTION OF EMBODIMENTS

Hereinafter, a method for producing a resistance-welded member according to the present invention will be described

Figure 1:
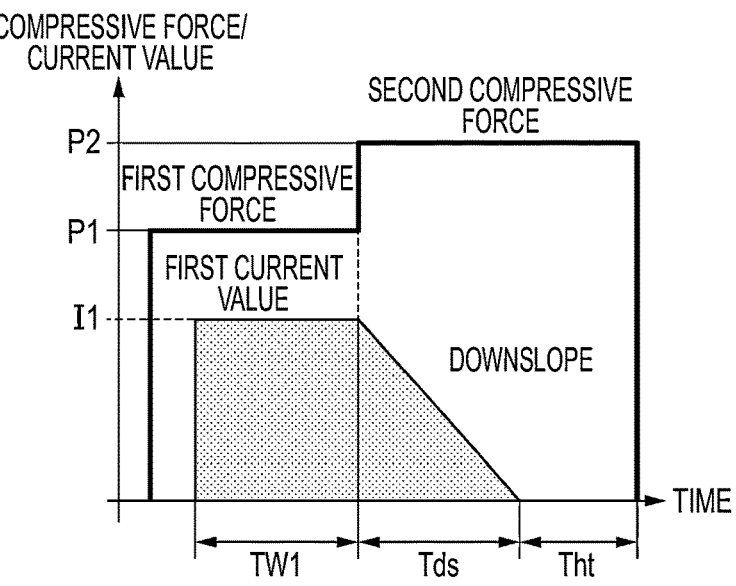
FIG. 1 is a graph of an energization pattern showing a relationship between a current value and a compressive force in a main energization step, a subsequent energization step, and an electrode holding step.

4 in detail with reference to the drawings. FIG. 1 is a graph showing a relationship between a current value and a compressive force in a main energization step, a subsequent energization step, and an electrode holding step in the method for producing a resistance-welded member of the present invention.

The method for producing a resistance-welded member according to the present invention is a producing method in which a resistance-welded member (member to be welded) formed of three or more plated high-tensile steel sheets including at least one plated high-tensile steel sheet having a base metal strength of 980 MPa or more is subjected to a main energization step, a subsequent energization step, and an electrode holding step, thereby welding the resistance-welded member.

Specifically, the main energization is performed by stacking and sandwiching three or more plated high-tensile steel sheets with a pair of welding electrodes, and performing energization with a first current value I1 for an energization time Tw1 while compressing with a first compressive force P1. Next, the subsequent energization is performed by a downslope in which a current value gradually decreases from the first current value I1 during a downslope time Tds while compressing with a second compressive force P2 greater than the first compressive force P1. Then, while maintaining the second compressive force P2, the welding electrodes and the plated high-tensile steel sheet are not in contact with each other (that is, the electrode is opened) after the elapse of an electrode holding time Tht from the end of the subsequent energization, and the plated high-tensile steel sheets are resistance-welded.

In the method for producing a resistance-welded member according to the present invention, each parameter is controlled so as to satisfy the following formulae (1) to (3) during the above-described resistance welding.

$$A \geq 1.9 \qquad \text{Formula (1)}$$

Where $A = P2/t$, P2 represents the second compressive force [kN], and t represents a total sheet thickness [mm] of the steel sheets, respectively.

$$0 \leq Tdl \leq 200 \qquad \text{Formula (2)}$$

Where Tdl represents a compression rise delay time [ms] which is a time difference between the end of energization with the first current value I1 and the start of compression with the second compressive force P2.

$$B \leq Tds \leq C \qquad \text{Formula (3)}$$

Where $B = 0.0011Tht^2 - 2.64Tht + 1284.8$, $C = 0.0015Tht^2 - 2.52Tht + 1268.6$, Tds represents an energization time [ms] in the subsequent energization step, and Tht represents an electrode holding time [ms] in the electrode holding step, respectively.

In the method for producing a resistance-welded member according to the present invention, each parameter is controlled so as to satisfy the following formula (4) as a preferable condition during the above-described resistance welding.

$$Tht < 700 \qquad \text{Formula (4)}$$

<Regarding Formula (1)>

During the above-described resistance welding, by performing the welding under the condition satisfying the formula (1), contraction of a nugget can be sufficiently suppressed even in the resistance welding of three or more plated high-tensile steel sheets, and as a result, the tensile stress generated in a nugget or inside of a corona bond is reduced. The upper limit of the second compressive force P2 is not particularly limited, but when the second compressive force P2 is 15 kN or more, the welding electrode may be excessively deformed, and thus P2<15 kN is preferable.

<Regarding Formula (2)>

The compression rise delay time Tdl, which is a time difference between the end of energization with the first current value I1 and the start of compression with the second compressive force P2, needs to be controlled within a condition range satisfying the formula (2). The compression rise delay time Tdl is set to a negative value when the second compressive force P2 rises before the end of the energization with the first current value I1 (that is, when the compression rises before the start of the downslope), and is set to a positive value when the second compressive force P2 rises after the end of the energization with the first current value I1 (that is, when the compression rises after the start of the downslope).

When the Tdl is less than 0 ms, rising of the compressive force occurs before the nugget starts to contract, and thus the effect of reducing the tensile stress generated in a heat-affected zone may not be obtained. In addition, when the Tdl exceeds 200 ms, the nugget has a large number of solidified portions and the rigidity thereof is increased, and thus the contraction cannot be sufficiently suppressed, and the intended effect may not be obtained.

<Regarding Formula (3) and Formula (4)>

The downslope in the subsequent energization step has an effect of gradually cooling the welded portion, and a temperature gradient in the joint is reduced, so that the tensile stress generated in the nugget or the inside of the corona bond at the time of electrode opening can be reduced. When the downslope time Tds is too small, the effect of slow cooling cannot be obtained. On the other hand, when the downslope time Tds is too large, the temperature at the time of electrode opening becomes high, and the breaking stress of the welded portion becomes low.

When the electrode holding time Tht is prolonged, the temperature of the welded portion at the time of electrode opening is lowered. As a result, an amount of molten zinc causing a crack is reduced, and the breaking stress of the welded portion is increased. On the other hand, since the temperature gradient in the joint becomes large, the tensile stress generated in the nugget or the inside of the corona bond at the time of electrode opening increases.

For the reason described above, as shown in the result of Example described later (see FIG. 2), there is an appropriate condition range for the downslope time Tds and the electrode holding time Tht. This appropriate condition is a condition satisfying the formula (3). For the same reason, the electrode holding time Tht preferably satisfies the formula (4).

<Regarding Tip End Diameter of Electrode>

A tip end diameter of the electrode used in the method for producing a resistance-welded member according to the present invention is preferably 4 mm to 10 mm, and more preferably 6 mm to 8 mm. When the tip end diameter of the electrode is 4 mm to 10 mm, an area in contact with the sheet is small, and a surface pressure at the electrode contact portion is increased. Therefore, the nugget contraction due to compression can be easily suppressed, and thus the LME crack can be effectively prevented. When the electrode diameter is smaller than this range, expulsion occurs before the nugget becomes large, and sufficient joint strength cannot be obtained. Conversely, when the electrode diameter is larger than this range, the current value necessary for nugget formation becomes large, and it becomes difficult to produce a resistance-welded member by a normal resistance welding machine.

<Control of Displacement Amount of Electrode>

When compression is performed during the energization, the nugget may be crushed more than necessary, and the melted metal may be discharged to the outside, that is, so-called expulsion may occur since the rigidity of the melted nugget is low. At the same time, the depth of an indentation on the steel sheet formed by the electrode (that is, an amount of penetration into the steel sheet by the electrode) is increased, and the LME crack is likely to occur in the electrode indentation portion and the periphery thereof. In order to effectively prevent this, it is preferable that the maximum displacement amount of the electrode is set to a predetermined numerical value in advance, and specifically, when the depth of the indentation on the steel sheet by the electrode becomes 0.15 mm or more, electrical displacement control is performed using a servo compression welding machine as a welding machine, for example, in order to forcibly terminate energization only or both energization and compression, thereby suppressing deformation of the nugget more than necessary, and further deformation of the indentation portion associated therewith, thereby suppressing occurrence of expulsion. This makes it possible to effectively prevent occurrence of expulsion even when the compression is performed with the second compressive force.

Example

In order to confirm the effects of the present invention, Examples of the method for producing a resistance-welded member according to the present invention and Comparative Examples to be compared with Examples will be described.

[Test Material]

Two types of plated steel sheets described below were used as test materials used for welding.

Abbreviation S1: 980 MPa grade GA plated steel sheet (Ceq=0.38), sheet thickness: 1.0 mm Abbreviation S2: 980 MPa grade GA plated steel sheet (Ceq=0.38), sheet thickness: 1.4 mm Carbon equivalent Ceq=C+Si/30+Mn/20+2P+4S. The element symbol in the above formula represents the content (mass %) of each element, and the content of an element is set to 0 when the element is not contained.

[Welding Conditions]

The following conditions were common to all Examples and Comparative Examples.

Set: three sheets of the same kind of material

Welding machine: servo compression single-phase alternating current welding machine Tilt angle: 5°

Sheet gap: 1 mm between sheets

Electrode: DR (dome radial) electrode made of chromium copper for both upper and lower electrodes (Tip end diameter: 6 mm or 8 mm, listed in Tables 1 and 2 for each Example and Comparative Example, tip end curvature radius: 40 mm)

A type of the steel sheet as the test material, a total sheet thickness t of the overlapped steel sheets, a first compressive force P1 [kN], a second compressive force P2 [kN], a first current value I1 [kA], a main energization time Tw1 [ms], a downslope time Tds [ms], a compression rise delay time Tdl [ms], and an electrode holding time Tht [ms] were set as shown in Table 1 and Table 2 for each of Examples and Comparative Examples.

It should be noted that the electrode holding time Tht is an actually measured value, and a compressive force measured by a load cell incorporated in a welding machine and a current value measured by a weld checker were read into a data logger, and the obtained voltage value was converted and measured. In addition, a time point at which an absolute value of the current value became 0.1 kA or less was defined as a start time point of the electrode holding time, and a time point at which the compressive force became 1 kN or less was defined as an end time point of the electrode holding time.

A cross section of the obtained resistance-welded joint was macroscopically observed by etching using a picric acid saturated aqueous solution, and the presence or absence of an internal crack of a nugget and an internal crack of a corona bond was examined. The observation magnification was 10 times. In addition, regarding the evaluation of the internal crack of a nugget and the internal crack of a corona bond, a sample in which no crack occurred was evaluated as "○" (good), and a sample in which a crack occurred was evaluated as "x" (poor).

Figure 2:
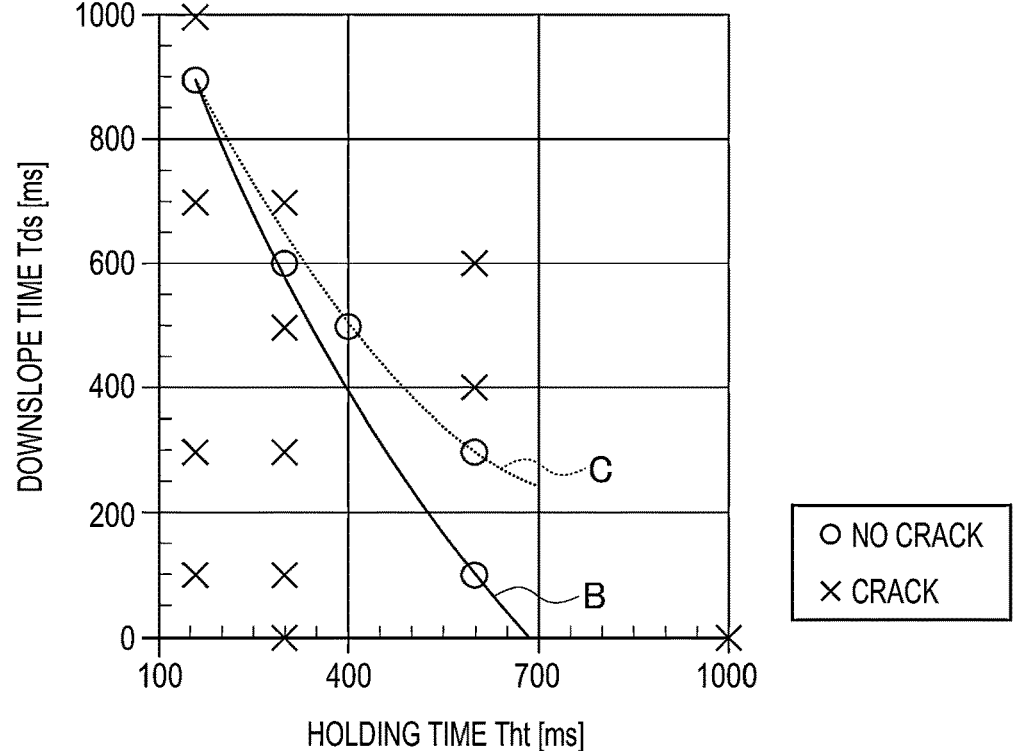
FIG. 2 is a graph of an experimental result showing a relationship between an electrode holding time Tht and a down slope time Tds and presence or absence of an LME crack.

The evaluation results of the internal crack of a nugget and the internal crack of a corona bond in each Example and Comparative Example are shown in Tables 1 and 2 together with the welding conditions. FIG. 2 shows a relationship between the electrode holding time Tht and the down slope time Tds and the presence or absence of a crack in a part of each Example and Comparative Example. In FIG. 2, "o" indicates that neither the internal crack of a nugget nor the internal crack of a corona bond occurred, and "x" indicates that at least one of the internal crack of a nugget and the internal crack of a corona bond occurred. Furthermore, "A" to "C" in Table 1 represent the following, respectively, as explained in the above formulae (1) and (3).

$$A = P2/t$$

$$B = 0.0011 Tht^2 - 2.64 Tht + 1284.8$$

$$C = 0.0015 Tht^2 - 2.52 Tht + 1268.6$$

TABLE 1

| | | | Compressive force | | | | Main energization | |
| | | | | | | | | |
| | Steel sheet | Total sheet thickness t [mm] | First compressive force P1 [kN] | Second compressive force P2 [kN] | A | Compression rise delay time Tdl [ms] | First current value I1 [kA] | Energization time TW1 [ms] |
|---|---|---|---|---|---|---|---|---|
| Example 1 | S1 | 3 | 5 | 8 | 2.7 | 0 | 5.5 | 400 |
| Example 2 | S1 | 3 | 3 | 6 | 2.0 | 0 | 5.5 | 400 |
| Example 3 | S2 | 4.2 | 5 | 8 | 1.9 | 0 | 5.5 | 400 |
| Example 4 | S2 | 4.2 | 5 | 8 | 1.9 | 0 | 5 | 400 |
| Example 5 | S2 | 4.2 | 5 | 8 | 1.9 | 0 | 5.5 | 400 |
| Example 6 | S2 | 4.2 | 5 | 8 | 1.9 | 0 | 6 | 400 |
| Example 7 | S2 | 4.2 | 5 | 8 | 1.9 | 0 | 5.5 | 400 |
| Example 8 | S2 | 4.2 | 5 | 8 | 1.9 | 0 | 5.5 | 400 |
| Example 9 | S2 | 4.2 | 5 | 8 | 1.9 | 0 | 5.5 | 400 |
| Example 10 | S2 | 4.2 | 5 | 8 | 1.9 | 0 | 5.5 | 400 |
| Example 11 | S2 | 4.2 | 5 | 8 | 1.9 | 100 | 5.5 | 400 |
| Example 12 | S2 | 4.2 | 5 | 8 | 1.9 | 200 | 5.5 | 400 |
| Example 13 | S2 | 4.2 | 5 | 10 | 2.4 | 0 | 5.5 | 400 |
| Comparative Example 1 | S2 | 4.2 | 5 | No | — | — | 5.5 | 400 |
| Comparative Example 2 | S2 | 4.2 | 5 | No | — | — | 5.5 | 400 |
| Comparative Example 3 | S2 | 4.2 | 5 | No | — | — | 5.5 | 400 |
| Comparative Example 4 | S2 | 4.2 | 5 | No | — | — | 5.5 | 400 |
| Comparative Example 5 | S2 | 4.2 | 5 | No | | | 5.5 | 400 |
| Comparative Example 6 | S2 | 4.2 | 5 | No | — | — | 5.5 | 400 |

| | Subsequent energization Downslope time Tds [ms] | Electrode holding time Tht [ms] | B | C | Tip end diameter of electrode [mm] | Evaluation Internal crack of nugget | Internal crack of corona bond |
|---|---|---|---|---|---|---|---|
| Example 1 | 900 | 160 | 891.56 | 907.8 | 6 | ○ | ○ |
| Example 2 | 600 | 300 | 592.8 | 651.6 | 6 | ○ | ○ |
| Example 3 | 900 | 160 | 891.56 | 907,8 | 6 | ○ | ○ |
| Example 4 | 600 | 300 | 592.8 | 651.6 | 6 | ○ | ○ |
| Example 5 | 600 | 300 | 592.8 | 651.6 | 6 | ○ | ○ |
| Example 6 | 600 | 300 | 592.8 | 651.6 | 6 | ○ | ○ |
| Example 7 | 600 | 300 | 592.8 | 651.6 | 8 | ○ | ○ |
| Example 8 | 500 | 400 | 405.8 | 504.6 | 6 | ○ | ○ |
| Example 9 | 100 | 600 | 97.8 | 300.6 | 6 | ○ | ○ |
| Example 10 | 300 | 600 | 97.8 | 300.6 | 6 | ○ | ○ |
| Example 11 | 600 | 300 | 592.8 | 651.6 | 6 | ○ | ○ |
| Example 12 | 600 | 300 | 592.8 | 651.6 | 6 | ○ | ○ |
| Example 13 | 600 | 300 | 592.8 | 651.6 | 6 | ○ | ○ |

TABLE 1-continued

| | | | | | | | |
|---|---|---|---|---|---|---|---|
| Comparative Example 1 | 0 | 300 | 592.8 | 651.6 | 6 | x | x |
| Comparative Example 2 | 300 | 300 | 592.8 | 651.6 | 6 | x | x |
| Comparative Example 3 | 600 | 300 | 592.8 | 651.6 | 6 | x | ○ |
| Comparative Example 4 | 100 | 600 | 97.8 | 300.6 | 6 | ○ | x |
| Comparative Example 5 | 300 | 600 | 97.8 | 300.6 | 6 | ○ | x |
| Comparative Example 6 | 600 | 600 | 97.8 | 300.6 | 6 | x | x |

TABLE 2

| | Steel sheet | Total sheet thickness t [mm] | Compressive force | | | Main energization | | |
|---|---|---|---|---|---|---|---|---|
| | | | First compressive force P1 [kN] | Second compressive force P2 [kN] | A | Compression rise delay time Tdl [ms] | First current value I1 [kA] | Energization time TW1 [ms] |
| Comparative Example 7 | S2 | 4.2 | 5 | 8 | 1.9 | 0 | 5.5 | 400 |
| Comparative Example 8 | S2 | 4.2 | 5 | 8 | 1.9 | 0 | 5.5 | 400 |
| Comparative Example 9 | S2 | 4.2 | 5 | 8 | 1.9 | 0 | 5.5 | 400 |
| Comparative Example 10 | S2 | 4.2 | 5 | 8 | 1.9 | 0 | 5.5 | 400 |
| Comparative Example 11 | S2 | 4.2 | 5 | 8 | 1.9 | 0 | 5.5 | 400 |
| Comparative Example 12 | S2 | 4.2 | 5 | 8 | 1.9 | 0 | 5.5 | 400 |
| Comparative Example 13 | S2 | 4.2 | 5 | 8 | 1.9 | 0 | 5.5 | 400 |
| Comparative Example 14 | S2 | 4.2 | 5 | 8 | 1.9 | 0 | 5.5 | 400 |
| Comparative Example 15 | S2 | 4.2 | 5 | 8 | 1.9 | 0 | 5.5 | 400 |
| Comparative Example 16 | S2 | 4.2 | 5 | 8 | 1.9 | 0 | 5.5 | 400 |
| Comparative Example 17 | S2 | 4.2 | 5 | 8 | 1.9 | 0 | 5.5 | 400 |
| Comparative Example 18 | S2 | 4.2 | 5 | 8 | 1.9 | 0 | 5.5 | 400 |
| Comparative Example 19 | S2 | 4.2 | 5 | 8 | 1.9 | −100 | 5.5 | 400 |
| Comparative Example 20 | S2 | 4.2 | 5 | 8 | 1.9 | 300 | 5.5 | 400 |
| Comparative Example 21 | S2 | 4.2 | 3 | 5 | 1.2 | 0 | 4.5 | 400 |
| Comparative Example 22 | S2 | 4.2 | 5 | 3 | 0.7 | 0 | 5.5 | 400 |
| Comparative Example 23 | S2 | 4.2 | 5 | 6 | 1.4 | 0 | 5.5 | 400 |
| Comparative Example 24 | S2 | 4.2 | 5 | 7 | 1.7 | 0 | 5.5 | 400 |

| | Subsequent energization Downslope time Tds [ms] | Electrode holding time Tht [ms] | B | C | Tip end diameter of electrode [mm] | Evaluation | |
|---|---|---|---|---|---|---|---|
| | | | | | | Internal crack of nugget | Internal crack of corona bond |
| Comparative Example 7 | 100 | 160 | 891.56 | 907.8 | 6 | ○ | x |
| Comparative Example 8 | 300 | 160 | 891.56 | 907.8 | 6 | ○ | x |
| Comparative Example 9 | 700 | 160 | 891.56 | 907.8 | 6 | ○ | x |
| Comparative Example 10 | 1000 | 160 | 891.56 | 907.8 | 6 | ○ | x |
| Comparative Example 11 | 0 | 300 | — | — | 6 | x | x |

TABLE 2-continued

| | | | | | | | |
|---|---|---|---|---|---|---|---|
| Comparative Example 12 | 0 | 1000 | — | — | 6 | ○ | x |
| Comparative Example 13 | 100 | 300 | 592.8 | 651.6 | 6 | ○ | x |
| Comparative Example 14 | 300 | 300 | 592.8 | 651.6 | 6 | ○ | x |
| Comparative Example 15 | 500 | 300 | 592.8 | 651.6 | 6 | ○ | x |
| Comparative Example 16 | 700 | 300 | 592.8 | 651.6 | 6 | ○ | x |
| Comparative Example 17 | 400 | 600 | 97.8 | 300.6 | 6 | ○ | x |
| Comparative Example 18 | 600 | 600 | 97.8 | 300.6 | 6 | ○ | x |
| Comparative Example 19 | 600 | 300 | 592.8 | 651.6 | 6 | ○ | x |
| Comparative Example 20 | 300 | 300 | 592.8 | 651.6 | 6 | ○ | x |
| Comparative Example 21 | 600 | 300 | 592.8 | 651.6 | 6 | ○ | x |
| Comparative Example 22 | 600 | 300 | 592.8 | 651.6 | 6 | x | x |
| Comparative Example 23 | 600 | 300 | 592.8 | 651.6 | 6 | ○ | x |
| Comparative Example 24 | 600 | 300 | 592.8 | 651.6 | 6 | ○ | x |

As shown in Table 1, in Examples 1 to 13, since the second compressive force P2 satisfied the condition of the above formula (1), the compression rise delay time Tdl satisfied the condition of the above formula (2), and the relationship between the down slope time Tds and the electrode holding time Tht satisfied the condition of the above formula (3), neither the internal crack of a nugget nor the internal crack of a corona bond occurred.

Figure 3:
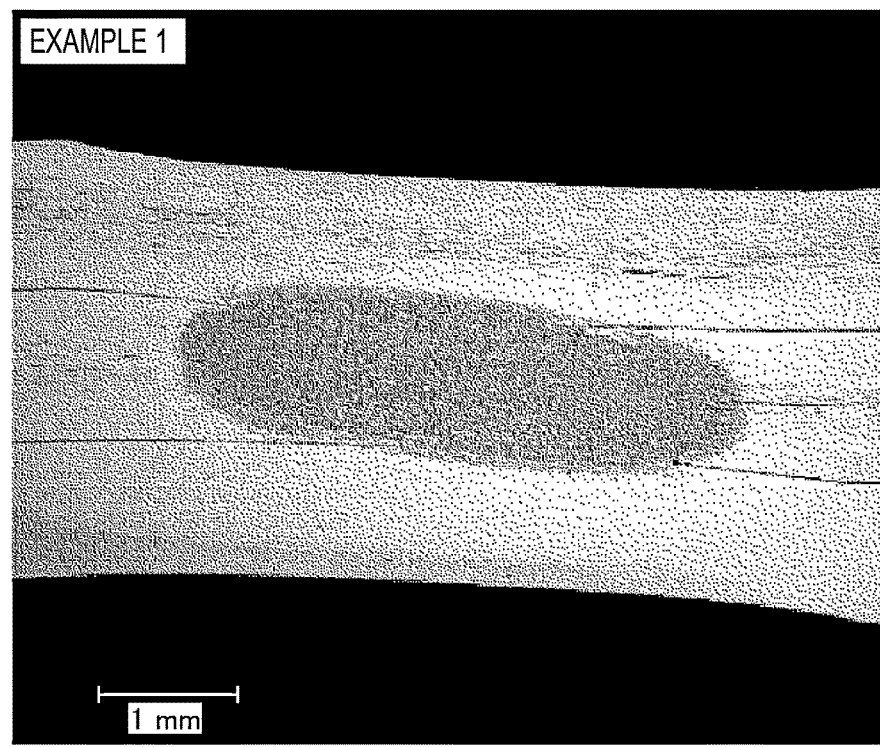
FIG. 3 is a cross-sectional photograph (drawing substitute photograph) showing a welded portion of Example 1.
Figure 4:
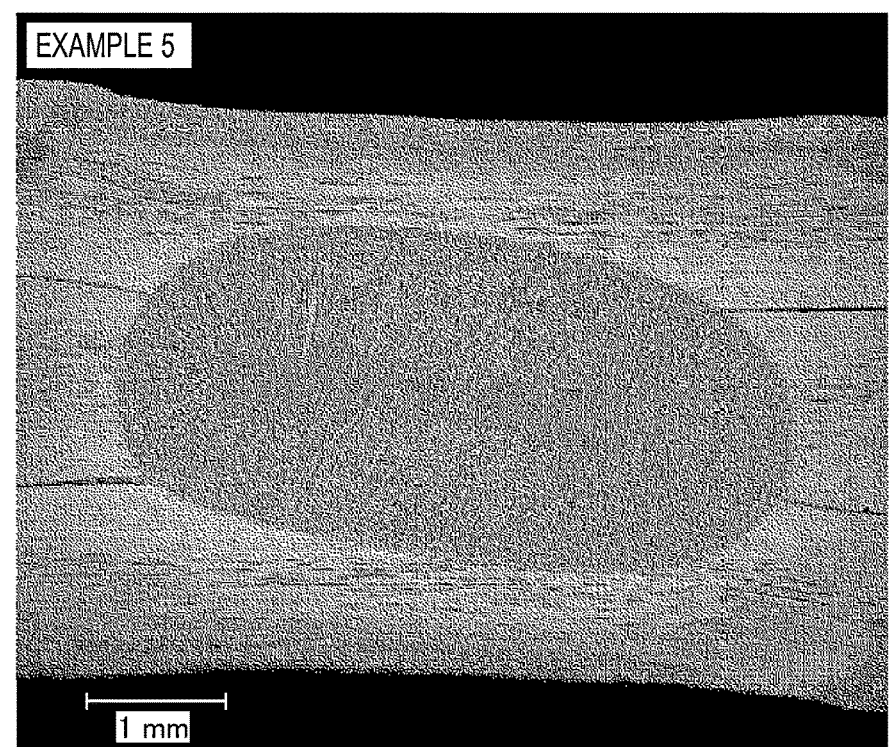
FIG. 4 is a cross-sectional photograph (drawing substitute photograph) showing a welded portion of Example 5.
Figure 5:
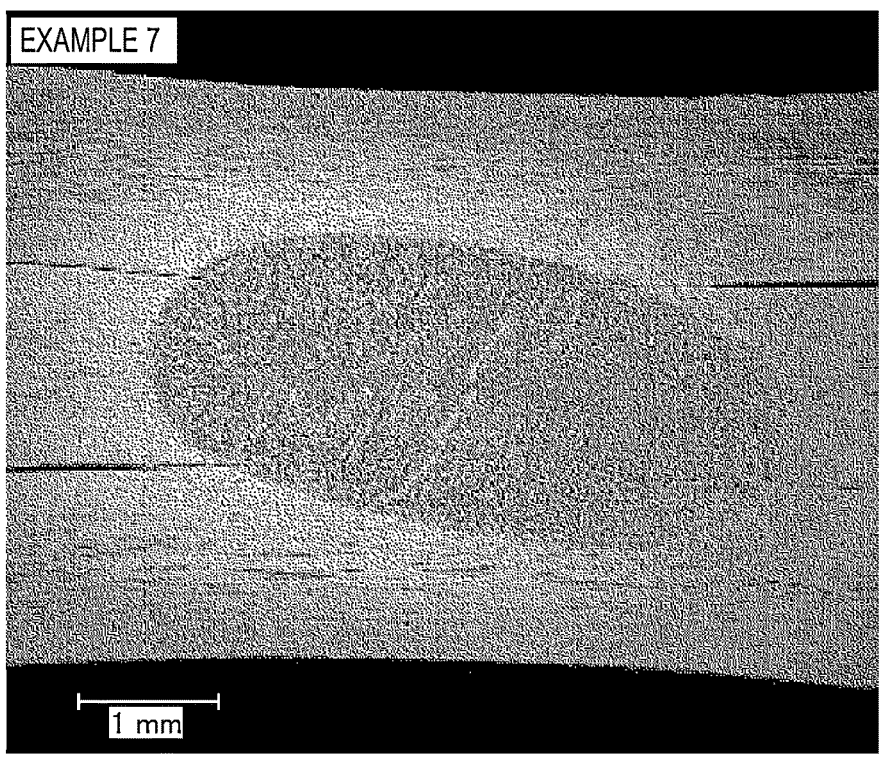
FIG. 5 is a cross-sectional photograph (drawing substitute photograph) showing a welded portion of Example 7.

As a representative example, FIG. 3 shows a cross-sectional photograph of a welded portion of Example 1 as an example of a resistance-welded joint using a steel material (test material) with an abbreviation S1. FIGS. 4 and 5 show Examples using a steel material (test material) with an abbreviation S2. FIG. 4 is a cross-sectional photograph of a welded portion using an electrode when the tip end diameter of the electrode is 6 mm (Example 5). FIG. 5 is a cross-sectional photograph of a welded portion using an electrode when the tip end diameter of the electrode is 8 mm (Example 7).

Here, it can be seen that, even when the steel type and the tip end diameter of the electrode are different, both the internal crack of a nugget and the internal crack of a corona bond did not occur by satisfying all the conditions of the formulae (1), (2), and (3) in any case.

On the other hand, in Comparative Examples 1 to 6 in which the second compressive force P2 greater than the first compressive force P1 was not applied as the subsequent energization step after the main energization step, at least one of the internal crack of a nugget and the internal crack of a corona bond crack occurred. In Comparative Example 1, the subsequent energization by the downslope was also not performed.

Figure 6:
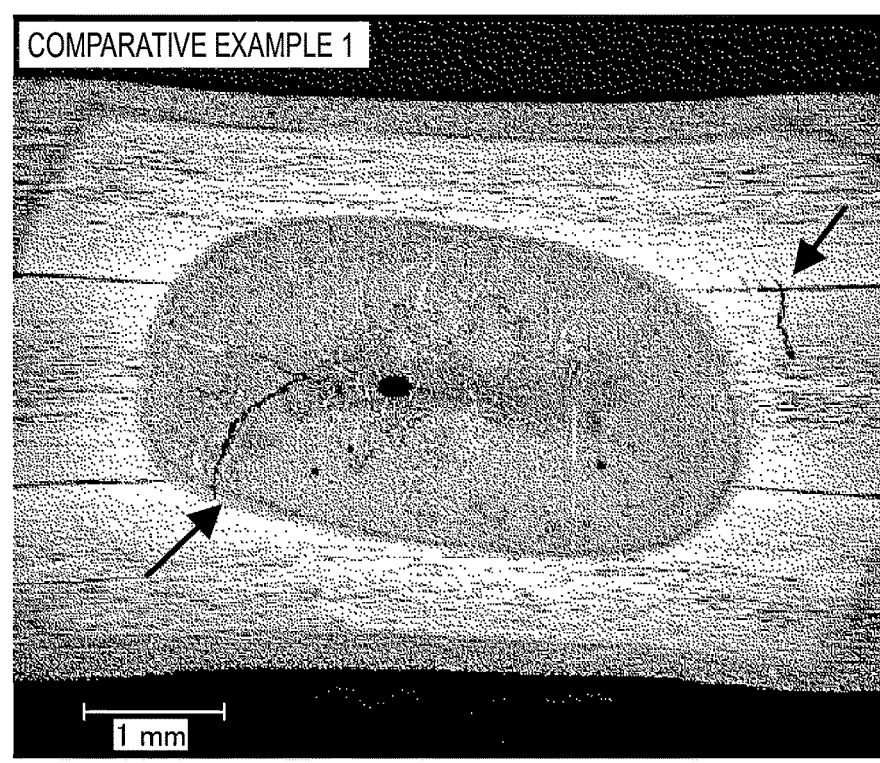
FIG. 6 is a cross-sectional photograph (drawing substitute photograph) showing a welded portion of Comparative Example 1.
Figure 7:
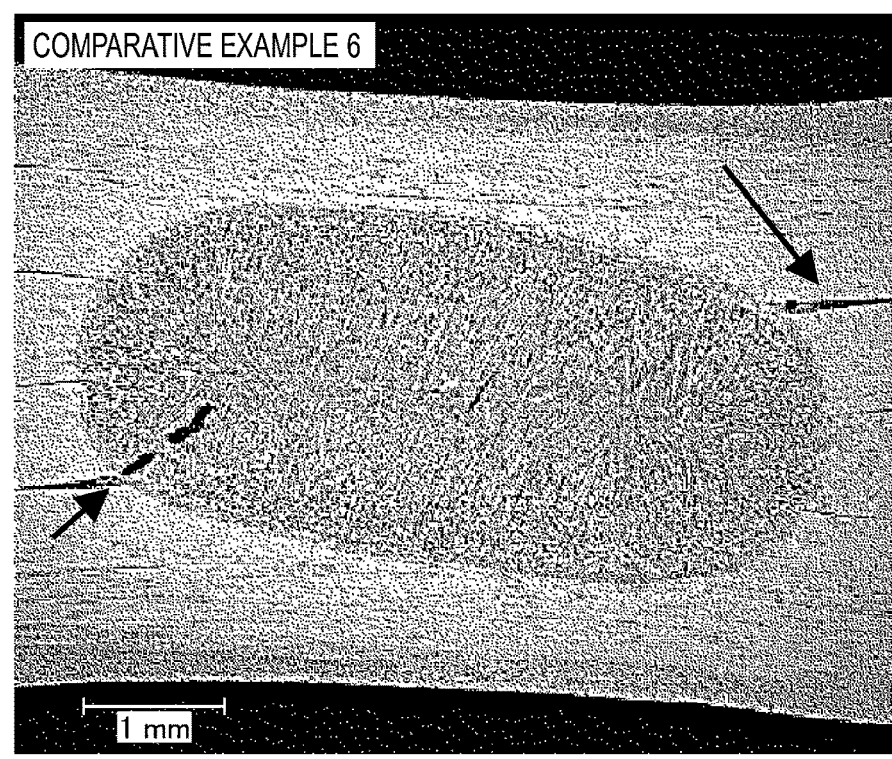
FIG. 7 is a cross-sectional photograph (drawing substitute photograph) showing a welded portion of Comparative Example 6.

As a representative example, FIG. 6 shows a cross-sectional photograph of a welded portion of Comparative Example 1 in which the electrode holding time Tht is 300 ms, and FIG. 7 shows a cross-sectional photograph of a welded portion of Comparative Example 6 in which the electrode holding time Tht is 600 ms. As indicated by arrows in FIGS. 6 and 7, it can be confirmed that the internal crack of a nugget or the internal crack of a corona bond occurs in any of the welded portions.

In Comparative Examples 7 to 18, since the relationship between the downslope time Tds and the electrode holding time Tht did not satisfy the condition of the formula (3), at least one of the internal crack of a nugget and the internal crack of a corona bond occurred.

Figure 8:
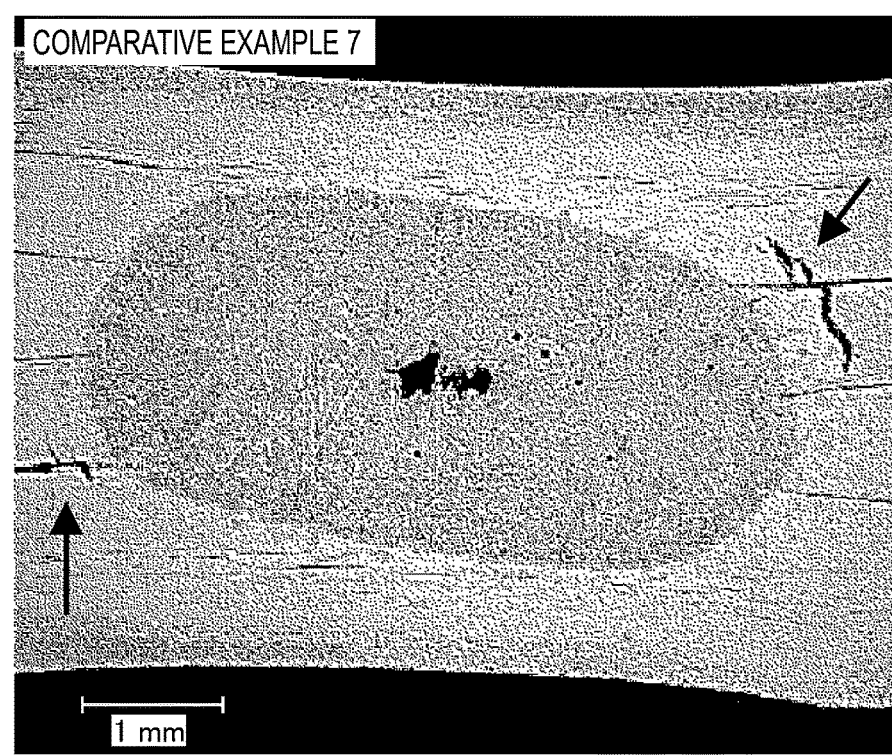
FIG. 8 is a cross-sectional photograph (drawing substitute photograph) showing a welded portion of Comparative Example 7.
Figure 9:
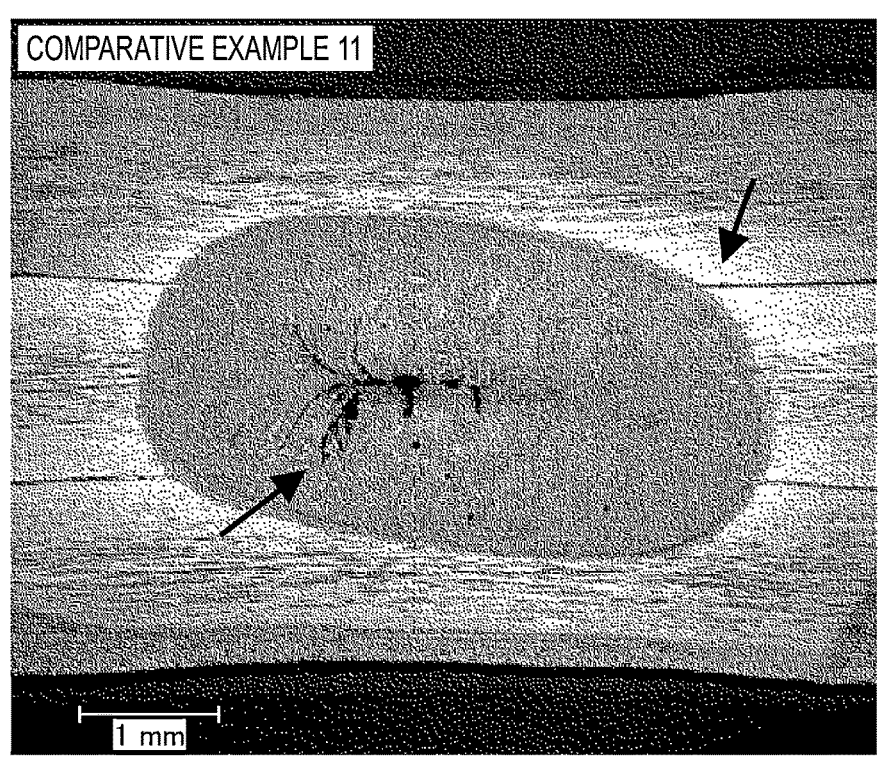
FIG. 9 is a cross-sectional photograph (drawing substitute photograph) showing a welded portion of Comparative Example 11.
Figure 10:
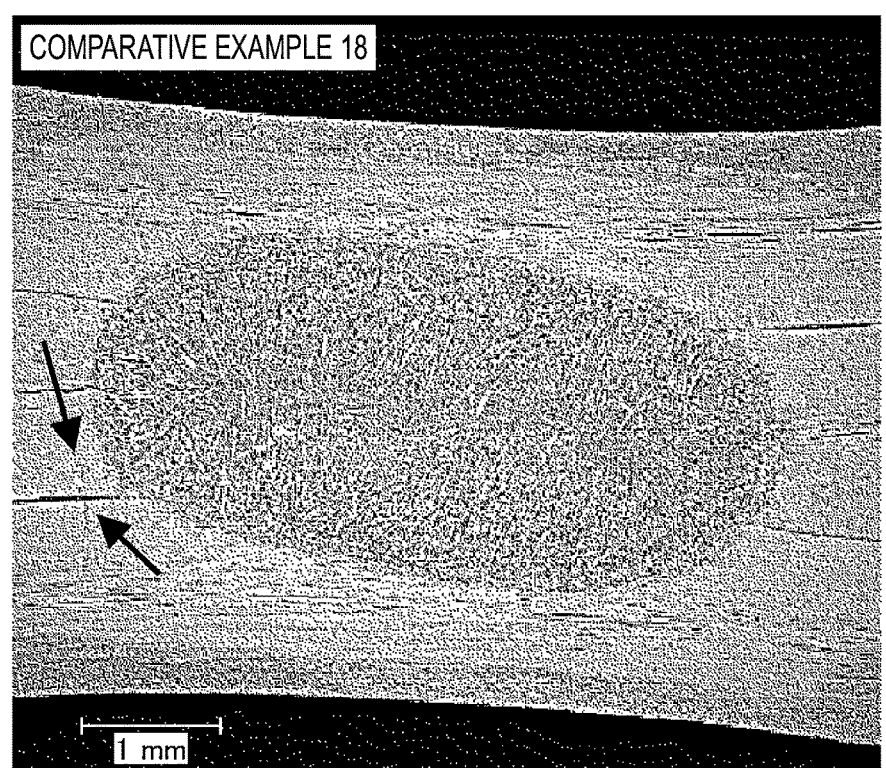
FIG. 10 is a cross-sectional photograph (drawing substitute photograph) showing a welded portion of Comparative Example 18.

As a representative example, FIG. 8 shows a cross-sectional photograph of a welded portion of Comparative Example 7 in which Tds<B, FIG. 9 shows a cross-sectional photograph of a welded portion of Comparative Example 11 in which Tds=0, and FIG. 10 shows a cross-sectional photograph of a welded portion of Comparative Example 18 in which Tds>C, respectively. As indicated by arrows in FIGS. 8 to 10, it can be confirmed that the internal crack of a nugget or the internal crack of a corona bond occurs in any of the welded portions.

Further, in Comparative Example 19 and Comparative Example 20, the compression rise delay time Tdl did not satisfy the condition of the formula (2), and in Comparative Example 21 to Comparative Example 24, the second compressive force P2 did not satisfy the condition of the formula (1), and thus at least one of the internal crack of a nugget and the internal crack of a corona bond occurred.

Figure 11:
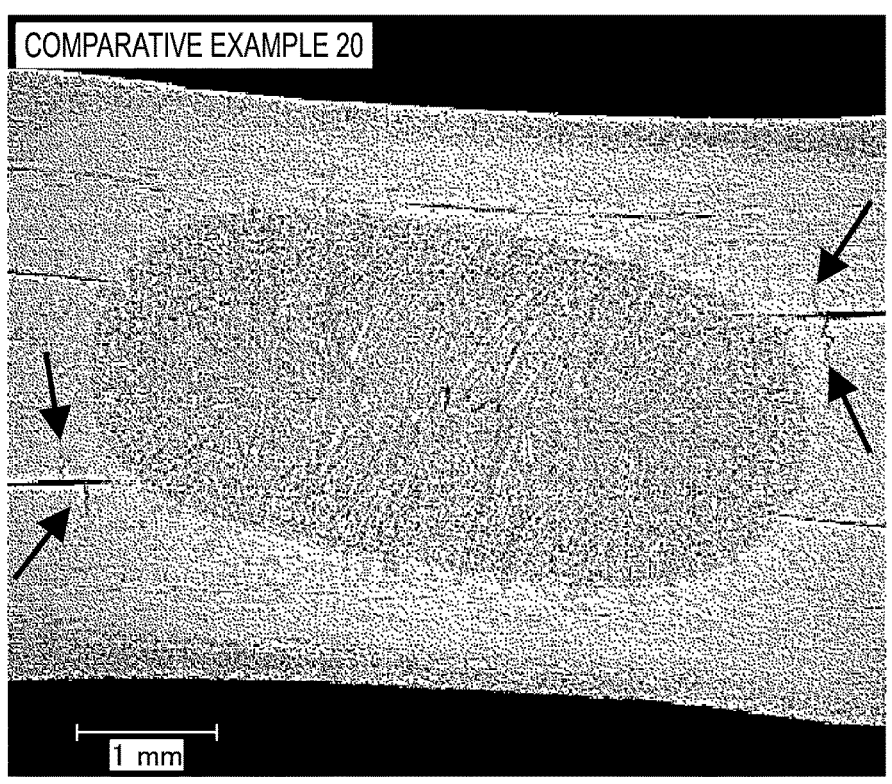
FIG. 11 is a cross-sectional photograph (drawing substitute photograph) showing a welded portion of Comparative Example 20.
Figure 12:
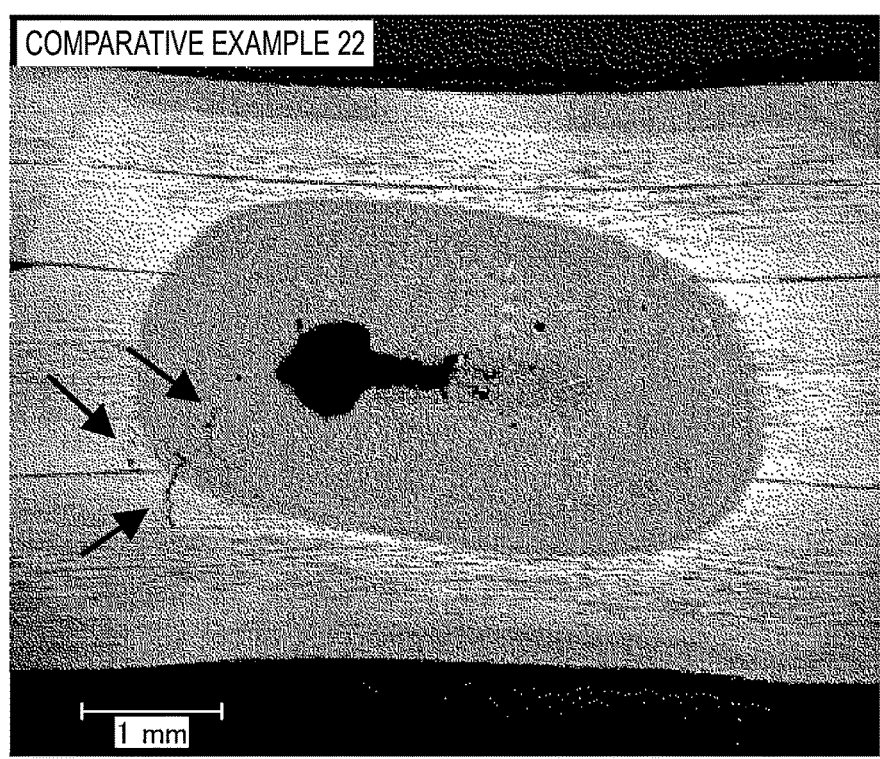
FIG. 12 is a cross-sectional photograph (drawing substitute photograph) showing a welded portion of Comparative Example 22.

As a representative example, FIG. 11 shows a cross-sectional photograph of a welded portion of Comparative Example 20 in which the compression rise delay time Tdl did not satisfy the condition of the formula (2), and FIG. 12 shows a cross-sectional photograph of a welded portion of Comparative Example 22 in which the second compressive force P2 did not satisfy the condition of the formula (1). As indicated by arrows in FIGS. 11 and 12, it can be confirmed that the internal crack of a nugget or the internal crack of a corona bond occurs in any of the welded portions.

In FIG. 2, a curve B indicates "Tds=0.0011Tht$^2$−2.64Tht+ 1284.8", and a curve C indicates "Tds=0.0015Tht$^2$− 2.52Tht+1268.6". Referring to the result of FIG. 2, the technical significance of satisfying the condition of the formula (3) described above can be understood.

The present invention is not limited to the embodiments and examples described above, and modifications, improvements, and the like can be made as appropriate.

As described above, the present specification discloses the following matters.

(1) A method for producing a resistance-welded member made of three or more steel sheets including at least one plated high-tensile steel sheet having a base metal strength of 980 MPa or more, the method comprising:

a main energization step of performing energization with a first current value I1 while compressing the steel sheets with a first compressive force P1 to form a nugget;

a subsequent energization step of performing, after the main energization step, energization such that a current value gradually decreases from the first current value I1 while compressing the steel sheets with a second compressive force P2 greater than the first compressive force P1; and an electrode holding step of holding an electrode while maintaining the second compressive force P2 after the subsequent energization, wherein the steel sheets are joined under conditions satisfying the following formulae (1) to (3):

$$A \geq 1.9 \qquad \text{Formula (1)}$$

where A=P2/t, P2 represents the second compressive force [kN], and t represents a total sheet thickness [mm] of the steel sheets, respectively, $$0 \leq Tdl \leq 200 \qquad \text{Formula (2)}$$

where Tdl represents a compression rise delay time [ms] which is a time difference between an end of energization with the first current value I1 and a start of compression with the second compressive force P2, and $$B \leq Tds \leq C \qquad \text{Formula (3)}$$

where B=0.0011 $Tht^2$−2.64Tht+1284.8, C=0.0015$Tht^2$−2.52Tht+1268.6, Tds represents a down slope time [ms] in the subsequent energization step, and Tht represents an electrode holding time [ms] in the electrode holding step, respectively.

According to this configuration, in the spot welding of a set of three or more sheets including a plated steel sheet, it is possible to suppress the internal crack of a nugget and the internal crack of a corona bond.

(2) The method for producing a resistance-welded member according to (1), wherein the Tht satisfies the following formula (4):

$$Tht < 700 \qquad \text{Formula (4).}$$

According to this configuration, the LME crack can be prevented by controlling the electrode holding time Tht within an appropriate range.

(3) The method of producing a resistance-welded member according to (1) or (2), wherein a tip end diameter of the electrode is 4 mm to 10 mm.

According to this configuration, the LME crack can be effectively prevented.

(4) The method for producing a resistance-welded member according to any one of (1) to (3), wherein, when a depth of an indentation on the steel sheet by the electrode becomes 0.15 mm or more, control is performed to forcibly terminate only the energization or both the energization and the compression.

According to this configuration, it is possible to suppress the deformation of the nugget more than necessary, and thus the deformation of the indentation portion associated therewith, and to suppress the occurrence of expulsion.

Although various embodiments have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Components in the embodiments described above may be combined freely within a range not departing from the spirit of the present invention.

The present application is based on a Japanese patent application (No. 2020-073130) filed on Apr. 15, 2020, contents of which are incorporated by reference in the present application.

REFERENCE SIGNS LIST

P1 First compressive force
P2 Second compressive force
I1 First current value
Tds Downslope time
Tht Electrode holding time
Tdl Compression rise delay time

The invention claimed is:

1. A method for producing a resistance-welded member made of three or more steel sheets including at least one plated high-tensile steel sheet having a base metal strength of 980 MPa or more, the method comprising:

a main energizing by performing energization with a first current value while compressing the steel sheets between a pair of electrodes with a first compressive force to form a nugget;

a subsequent energizing by performing, after the main energizing, energization such that a current value gradually decreases from the first current value while compressing the steel sheets between the pair of electrodes with a second compressive force greater than the first compressive force; and holding the pair of electrodes against the steel sheets while maintaining the second compressive force after the subsequent energizing, wherein:

the steel sheets are joined under conditions satisfying formulae (1) to (3):

$$A \geq 1.9 \qquad \text{Formula (1)}$$

wherein A=P2/t;
P2 represents the second compressive force [kN]; and
t represents a total sheet thickness [mm] of the steel sheets, respectively;

$$0 \leq Tdl \leq 200 \qquad \text{Formula (2)}$$

wherein Tdl represents a compression rise delay time [ms] which is a time difference between an end of energization with the first current value and a start of compression with the second compressive force; and $$B \leq Tds \leq C \qquad \text{Formula (3)}$$

wherein B=0.0011$Tht^2$−2.64Tht+1284.8, C=0.0015$Tht^2$−2.52Tht+1268.6;

Tds represents a down slope time [ms] in the subsequent energizing; and

Tht represents an electrode holding time [ms], which is a time for holding the pair of electrodes against the steel sheets in the holding the electrode, respectively.

2. The method for producing a resistance-welded member according to claim 1, wherein the Tht satisfies formula (4):

$$Tht < 700 \qquad \text{Formula (4).}$$

3. The method of producing a resistance-welded member according to claim 1, wherein a tip end diameter of the electrode is from 4 mm to 10 mm.

4. The method for producing a resistance-welded member according to claim 1, wherein:

a servo compression welding machine is employed as a welding machine; and when a depth of an indentation on the steel sheet by the electrode becomes 0.15 mm or more, a control is performed to forcibly terminate only the main energizing or both the main energizing and a compression.

5. The method for producing a resistance-welded member according to claim 2, wherein:

a servo compression welding machine is employed as a welding machine; and when a depth of an indentation on the steel sheet by the electrode becomes 0.15 mm or more, a control is performed to forcibly terminate only the main energizing or both the main energizing and a compression.

6. The method of producing a resistance-welded member according to claim 2, wherein a tip end diameter of the electrode is from 4 mm to 10 mm.

7. The method for producing a resistance-welded member according to claim 3, wherein:

a servo compression welding machine is employed as a welding machine; and when a depth of an indentation on the steel sheet by the electrode becomes 0.15 mm or more, a control is performed to forcibly terminate only the main energizing or both the main energizing and a compression.

8. The method for producing a resistance-welded member according to claim 6, wherein:

a servo compression welding machine is employed as a welding machine; and when a depth of an indentation on the steel sheet by the electrode becomes 0.15 mm or more, a control is performed to forcibly terminate only the main energizing or both the main energizing and a compression.

* * * * *